Patent [19] [11] 3,790,284
Baldwin [45] Feb. 5, 1974

[54] INTERFEROMETER SYSTEM FOR MEASURING STRAIGHTNESS AND ROLL

[75] Inventor: Richard R. Baldwin, Saratoga, Calif.
[73] Assignee: Hewlett-Packard Company, Palo Alto, Calif.
[22] Filed: May 8, 1972
[21] Appl. No.: 250,903

[52] U.S. Cl. .............................. 356/106, 356/110
[51] Int. Cl. ............................................. G01b 9/02
[58] Field of Search ........................... 356/106-113

[56] References Cited
UNITED STATES PATENTS
3,523,735   8/1970   Taylor.................................. 356/106
3,458,259   7/1969   Baglen et al. ....................... 356/106

OTHER PUBLICATIONS
"An Interferometer for Straightness Measurement," Nature, March 1955, pg. 559-560, Dyson.

Primary Examiner—Ronald L. Wibert
Assistant Examiner—Conrad Clark
Attorney, Agent, or Firm—Roland I. Griffin

[57] ABSTRACT

An interferometer system for measuring straightness including a light source for producing a beam of light, preferably a two frequency laser with the two frequency components linearly polarized and orthogonal to one another, the light beam being directed through a Wollaston prism where the beam is split into two separate paths which deviate, in opposite paths, from the original beam direction by a small angle. The two separate beams are transmitted over two separate paths to associated ones of two separate reflective surfaces which are mounted in a mutually fixed relationship and at an angle to each other. The two beams are reflected back into the prism from the associated reflective surfaces where they are recombined. Photodetector means are provided for detecting any changes in the fringes resulting from a change in one optical path length relative to other optical path length as the two mirrors move relative to the prism, said change in path lengths resulting from deviations from straightness in such movement. A dual system is disclosed for measuring rotational motion, i.e., roll.

9 Claims, 6 Drawing Figures

INTERFEROMETER SYSTEM FOR MEASURING STRAIGHTNESS AND ROLL

BACKGROUND OF THE INVENTION

In the U.S. Pat. application Ser. No. 111,596 and now abandoned filed on Feb. 1, 1971, by Richard R. Baldwin et al. entitled "Laser Interferometer System Comprising Passive Interferometer Section and Active Section" and in an article published in Hewlett-Packard Journal, Dec. 1971, pages 14–19, by Richard R. Baldwin et al. entitled "Remote Laser Interferometry" there is described a laser interferometer system including an active section comprising the laser/electronics package and a completely passive section. This interferometer, in a preferred embodiment, employs a two frequency gas laser interferometer of the type described in U. S. Pat. No. 3,458,259 issued to A. S. Bagley et al. on July 29, 1969, entitled "Interferometric System."

The U.S. Pat. application Ser. No. 111,596 describes an interferometer system useful, for example, in measuring small changes in the axial translation of a machine tool, i.e., lead-screw or scale error, as well as measuring pitch, i.e., rotation about the horizontal axis perpendicular to the main axis or leadscrew axis, and measuring yaw, i.e., rotation about the vertical axis perpendicular to the main axis. Thus three measurements of importance to machine tool manufacturers are presently being made by such interferometers, one translational movement and two rotational movements.

In addition to these three movements, machine tool manufacturers are interested in three other motions, two lateral translations, i.e, motion along the horizontal axis normal to the main axis and also along the vertical axis normal to the main axis, and roll, the rotational motion about the main axis.

For small tools, a straightedge member may be employed to measure the two lateral translations, or straightness, by noting changes in the length of an indicator between the straight-edge and the machine element as the indicator moves along the straightedge. This works fairly well for short machine elements, for example, lengths up to two feet, but as the axial length increases, the size and weight of the straightedge increases and the straightedge becomes bulky and difficult to handle. Also, thermal conditions produce errors in the straightedge measurements. Telescopic techniques have also been employed for straightness measurements, but this requires precise optical alignment and visual observation, and the resolution decreases with distance.

The most popular technique at present employs a centering detector including a laser emitting a beam of light parallel to the main axis of movement of the machine element and four photodetection circuits mounted on the movable machine element and spaced in four quadrants about the center axis of the laser beam. With the laser beam axis aligned at the center of the quadrant assembly of photodetectors, equal portions of the light beam impinge on the four photodetectors and they produce a balanced output. As the machine element and associated four-section photodetector assembly move axially, any unbalance of the outputs of the four photodetector circuits serves as a measure of the horizontal or vertical shift-off axis of the moving element. Although effective over long distances, one main problem with such centering detectors stems from the fact that the laser beam tends to wander and to rotate about the normal beam axis, resulting in unbalance in the photodetector outputs erroneously read as deviations in straightness. Such centering detectors are generally limited to an accuracy of about $100\mu$in. $+ 10\mu$in./foot.

SUMMARY OF THE PRESENT INVENTION

The present invention provides an interferometer system for measuring straightness, i.e., the lateral motions, both vertical and horizontal, normal to the main axis. A dual system is employed for measuring roll, the rotational motion about the main axis.

The interferometer provides a light beam directed through a Wollaston prism where the original beam is split into two separate paths which deviate, in opposite directions, from the original beam direction by a small angle. The two separate beams are then directed onto two reflector means, for example, mirrors, mounted in a mutually fixed relationship and at an angle to each other. The two beams are reflected from the two associated reflectors back into the Wollaston prism where the beams are recombined to form interference fringes which are then directed onto suitable means in the interferometer detection system responisve to fringes. During relative movement between the two reflectors and the Wollaston prism, any change in the optical length of one beam path relative to the other beam path between the prism and the two reflectors will produce a change in the interference fringes which is counted as a measure of the path length change. Since any such relative optical path length change results from deviations from the straightness of the movement between the prism and the two mirrors, the fringe count serves to measure the straightness. Small motions of the light source (laser) affect the optical path length of each beam equally and cause no net difference in optical path length. Therefore, the system is insensitive to pointing stability of the laser.

In a preferred embodiment of the invention, the light is a two frequency beam from a gas laser, the two frequency components being linearly polarized and positioned orthogonal to one another. These two differently polarized signals are split into the two desired beam paths by the Wollaston prism.

In certain embodiments the two reflectors are held stationary and the Wollaston prism is mounted on the movable machine element whereas in other embodiments the prims is held stationary and the two mirrors mounted for movement.

By utilizing two such straightness measuring systems positioned so that the two reflector pairs lie equal distant from and on opposite sides of a main axis, and by subtracting the fringe count produced in one interferometer system from that produced in the other interferometer system, the rotational motion, i.e. roll, about the main axis may be measured.

DESCRIPTION OF THE PREFERRED EMBODIMENTS

Figure 1:
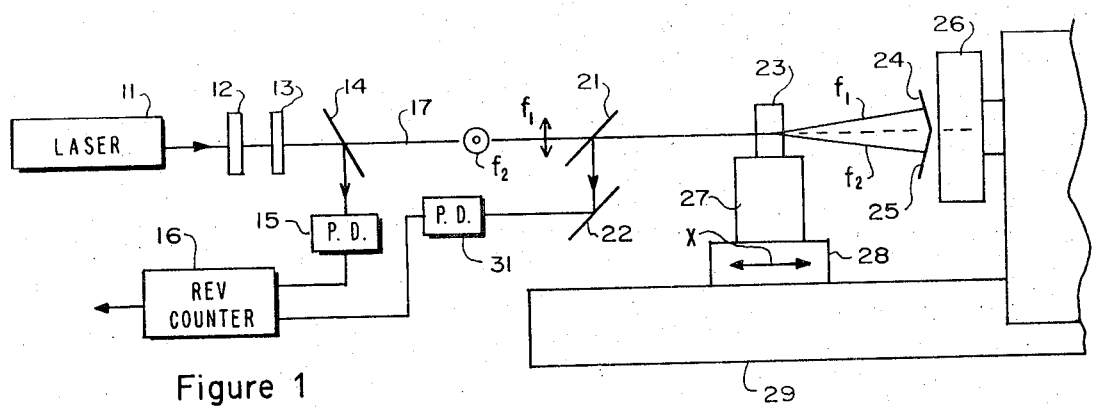
FIG. 1 is a schematic drawing of a preferred embodiment of the straightness measuring interferometer system of the present invention.

Referring now to FIG. 1, in a preferred embodiment of this invention the novel interferometric system comprises a gas laser 11 emitting a light beam with two frequency components $f_1$ and $f_2$, the beam being passed through a quarter wave plate 12 and a half wave plate 13 to convert the $f_1$ and $f_2$ signals into linear polarizations orthogonal to each other. In this illustration, $f_1$ is shown polarized in the plane of the drawing and $f_2$ perpendicular thereto. This beam is directed to a beam splitter 14 where a portion of the two frequency beam is transmitted as a reference signal to a reference photodetector circuit 15. The frequency output of this reference photodetector 15 $(f_1 - f_2)$ is transmitted to one of the inputs of a reversible counter 16. The other portion 17 of the beam is transmitted through the beam splitter 14.

The interferometer includes a non-polarizing beam splitter 21, a turning mirror 22, a Wollaston prism 23, and a pair of plane reflectors or mirrors 24 and 25. In this particular embodiment, the two mirrors 24 and 25 are fixedly secured to the spindle element 26 of a lathe type machine tool while the Wollaston prism 23 is securely mounted on a tool holder 27 affixed to a slide element 28 which is movable along the machine bed 29 in the axial or X direction. The plane of each mirror is tilted slightly relative to the plane of the spindle, the apex of the two mirrors at their junction line lying along a horizontal axis and also at the central axis through the spindle. With this arrangement and with the spindle 26 and mirrors 24 and 25 held stationary, the vertical translational motion of the tool holder 27 may be measured relative to the axis through the center of the spindle.

The two frequency beam 17 passing through the beam splitter 21 enters the Wollaston prism which is aligned with the beam such that one frequency, for example $f_1$, becomes the ordinary ray and the other frequency, $f_2$, becomes the extraordinary ray. The Wollaston prism then separates these two frequencies, and they emerge from the prism at slightly different angles from the original beam, the two frequencies undergoing equal and opposite deviation in the vertical plane. The $f_1$ beam travels to the mirror 24 where it is reflected back to the Wollaston prism and the $f_2$ beam travels to the mirror 25 and is reflected back to the Wollaston prism. The two beams are recombined in the prism 23 and the recombined beam is then partially reflected by the beam splitter 21 to the turning mirror 22 which directs the beam back in a path parallel to the original beam and on to the doppler photodetector circuit 31 of the interferometer sensor system.

Figure 2:
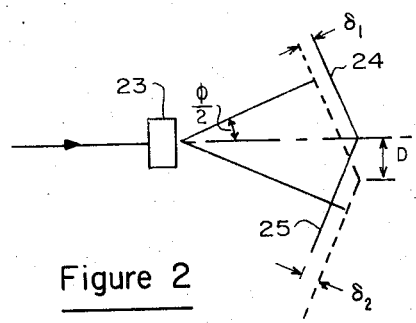
FIG. 2 is an illustration of the effect produced by the lateral movement of the reflective surface in the system of FIG. 1.

At the start of the travel of the slide 28, the prism 23 is aligned such that the apex of the two mirrors at the spindle axis is aligned with the original beam and the lengths of the optical paths for $f_1$ and $f_2$ between the prism 23 and the associated mirrors 24, 25 are equal. This condition is illustrated in FIG. 2 where the mirrors 24 and 25 are shown in solid lines. In this situation, and with the tool holder 27 stationary, the combined beam $f_1$ and $f_2$ is fed back to the doppler photodetector 31, the output of the detector circuit $(f_1 - f_2)$ being transmitted to the other input of the reversible counter 16. The counter will produce an output count representing the fringe count, if any, between the doppler input and the reference input at this initially aligned state.

As the slide 28 and tool holder 27 are moved relative to the spindle 26, the path lengths of $f_1$ and $f_2$ between the prism 21 and the two mirrors 24, 25 will change, so that the return beam will be $f_1 \pm \Delta f_1$ and $f_2 \pm \Delta f_2$. However, so long as the original beam axis through the Wollaston prism remains in alignment with the apex of the mirrors, i.e., the axis through the spindle, the path lengths of $f_1$ and $f_2$ will change equally and no change in fringe count will be detected. If the prism 23 moves in a direction perpendicular to the main axis a distance D, due to out of straightness in the vertical direction, then the path length of $f_1$ is shortened by a distance $\delta_1$ whereas the path length of $f_2$ is lengthened by a distance of $\delta_2$. The return beam is now $f_1 + \Delta f_1$ and $f_2 - f_2$ and a fringe count is recorded by the interferometer as a measure of the change in optical path differences of $\delta_1 + \delta_2$ where $\delta_1 = \delta_2 = D \sin \phi/2$. The interferometer will read the distance D as 2D $\sin \phi/2$; by making 2 $\sin \phi/2$ equal to 0.1 or 0.01, the interferometer will read D in direct units.

Figure 3:
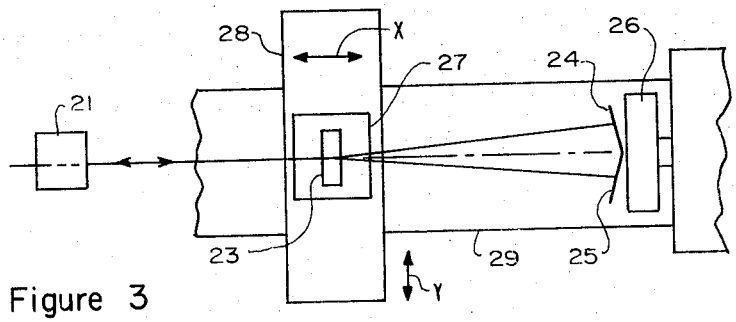
FIGS. 3 and 4 are schematic diagrams illustrating the operation of the interferometer of the present invention in making a different straightness measurement and a squareness measurement, respectively.

Referring now to FIG. 3 there is shown an interferometric system similar to that of FIG. 1 but arranged to measure the straightness in the Y direction normal to the main axis through the spindle as the slide member 28 moves along the X direction; the apparatus is viewed from the top. The two plane mirrors 24, 25 are positioned 90° with respect to the positioning in FIG. 1 and the Wollaston prism oriented to deviate the two frequency beams $f_1$ and $f_2$ in the horizontal plane (the plane of the drawing) and toward the two mirrors 24, 25. The remainder of the system including the beam splitter 21 and the turning mirror 22 (under the beam splitter 21 in this view) is the same as in FIG. 1, and any deviation of the work holder 27 in the Y direction from the main axis results in a fringe count change related thereto.

Figure 4:
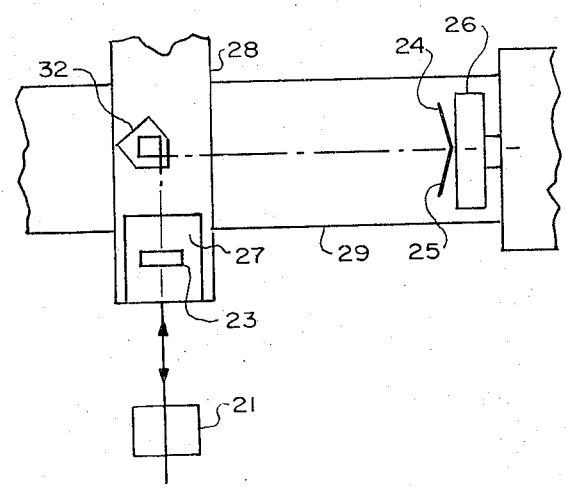

The arrangement of FIG. 4 illustrates a modification of the system of FIG. 3 to measure the squareness of the tool holder movement along the Y direction normal to the main axis along the X direction. The mirrors 24 and 25 remain untouched and the tool holder 27 is backed off along the slide 28. The Wollaston prism is oriented 90° relative to its position in FIG. 1. The slide 28 is secured on the bed 29. The laser and sensor components are moved normal to the position shown in FIG. 3 so that the original beam and return beam are directed through the Wollaston prism 23 and normal to the axis through the spindle 26. A pentaprism 32 is positioned at the intersection of the main spindle axis and the Y slide axis. The $f_1$ and $f_2$ beams are split by the prism 23 and follow separate but equal length paths through the pentaprism 32 to the associated mirrors 24, 25 and back. So long as the slide 27 moves along the Y axis exactly normal to the X axis, the optical paths for $f_1$ and $f_2$ to the mirrors remain equal to each other and no change in fringe count is recorded by the system. However, if the slide 27 and prism 23 move off the normal Y axis, the $f_1$ and $f_2$ optical path lengths change and are recorded as fringe counts directly related to the deviation from squareness.

Although in the systems described above the two mirrors were held stationary and the Wollaston prism moved relative thereto on the moving machine element, in certain uses it is desirable to hold the Wollaston prism stationary and mount the mirrors on the moving element. For example, in measuring the straightness of the X–Y stage in a milling machine, the Wollaston prism is affixed where the cutting tool is normally held and the two mirror assembly is positioned on the particular moving plate, the X section or the Y section, that is to be measured. The system operates as described above to measure the straightness of movement of the stage section relative to the tool axis.

Figure 5A:
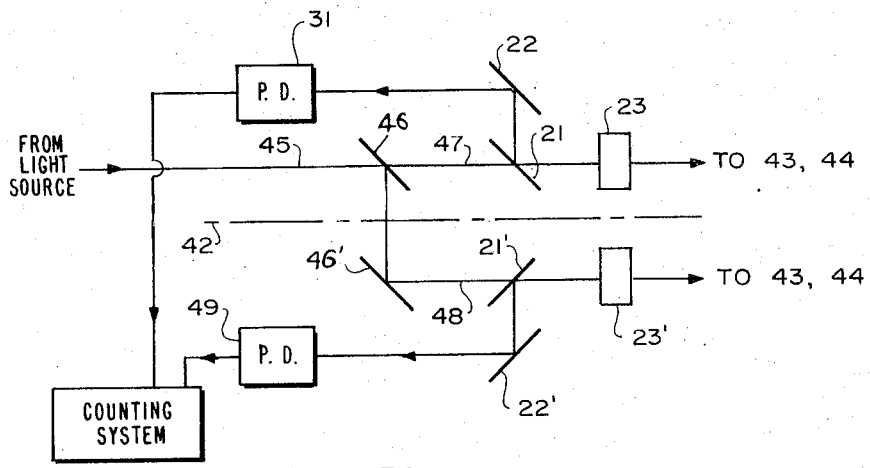
FIGS. 5A and 5B are schematic diagrams, the latter in perspective view, showing a dual system useful in measuring rotational motion or roll.
Figure 5B:
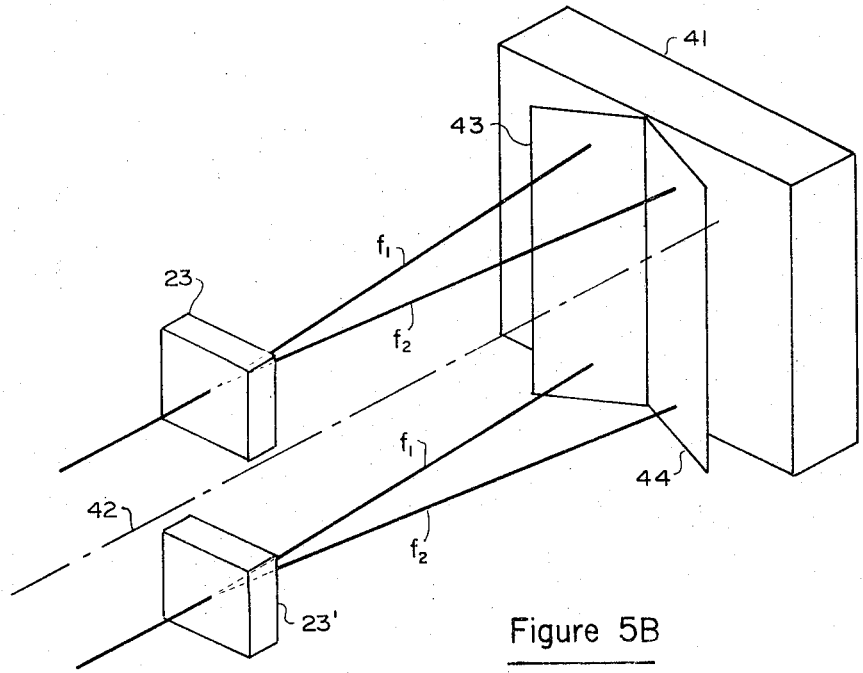

Referring now to FIGS. 5A and 5B there is shown a portion of a dual interferometer system whereby limited rotational motion or roll of an object 41 about a main axis 42 may be measured. A pair of reflectors or mirrors 43, 44 are securely mounted on the object 41 and will rotate with the object about the main axis 42. Therefore, as the upper portions of the two mirrors 43, 44 move in one direction, the lower portions of the two mirrors 43, 44 move in the opposite direction.

The two frequency beam 45 from the laser unit comprising $f_1$ and $f_2$ which are linearly polarized and orthogonal to each other is split by suitable optics 46, 46' into two separate parallel beams 47, 48 each of which passes through an associated beam splitter 21 and 21', respectively, and then passes into an associated Wollaston prism 23, 23'. In the illustration of FIGS. 5A and 5B, the upper two frequency beam passes into Wollaston prism 23 and the lower parallel two frequency beam passes into Wollaston prism 23'. The two Wollaston prisms are equally spaced from the main axis 42 through the object 41. The upper Wollaston prism 23 is oriented so as to split the upper beam into the desired $f_1$ and $f_2$ beams in an upper horizontal plane, the two beams being directed onto the upper portions of the two mirrors 43, 44, respectively, a predetermined distance from the axis. The lower Wollaston prism 23' is oriented so as to split the lower beam into the desired $f_1$ and $f_2$ beams in a lower horizontal plane and onto the lower portions of the two mirrors 43, 44, respectively, spaced the same distance from the main axis as the two upper beams.

The two beams $f_1$ and $f_2$ in the upper plane are reflected from the mirrors 43, 44 back to the upper prism 23 and recombined, then transmitted back to the beam splitter 21 and to the turning mirror 22 to direct this recombined beam to a first doppler photodetector circuit 31 in the sensor unit. The two beams $f_1$ and $f_2$ in the lower plane are reflected from the mirrors 43, 44 back to the lower prism 23' and recombined and directed by th lower beam splitter 21' and turning mirror 22' to a second doppler photodetector circuit 49 in the sensor unit. The two photodetector circuits 31 and 49 serve as doppler photodetectors, and the frequency outputs from these two circuits are subtracted in suitable circuitry to give a fringe count dependent on the roll of the object 41 during relative axial movement along axis 42 between the mirrors 43, 44 an the two Wollaston prisms 23, 23'. Lateral movement, i.e., both the lower and upper portions of the mirrors moving in thesame direction, results in a cancelling out of the fringe count so that only rotational motion is sensed.

Although the system utilizing two plane mirrors is preferred due to its simplicity, other optical systems may be utilized to practice the present invention. For example, a cube corner may replace the two mirrors, and the output of the Wollaston prism passed through a beam expander including a pair of lenses and into the cube corner. After retroreflection from the cube corner, the two beams $f_1$ and $f_2$ return through the lens system into the Wollaston prism where they are recombined. So long as the apex of the cube corner remains on the main axis as the cube corner moves along the axis, no fringe count is recorded. Should the apex move off the axis, then the path lengthens for $f_1$ and $f_2$ change relation to each other and the fringe count is made as described above.

In another embodiment, the plane mirrors can be replaced by porroprisms. In such case the beam splitter 21, turning mirror 22 assembly may be omitted. However porroprisms are relatively expensive and the plane mirror approach is therefore preferred.

It should be understood that the two frequency laser is shown as a preferred embodiment of the invention. Other monochromatic light sources with means to create two differently polarized beams associated with the two measuring paths may be employed to practice the present invention.

I claim:

1. An interferometric system comprising:
   a light source for producing a principal light beam along a principal axis;
   beam splitting means positioned in the path of the principal light beam for splitting the principal light beam into first and second associated light beams and deviating the first and second associated light beams from the direction of the principal light beam by equal and opposite angular deviations;
   first and second plane reflecting surfaces positioned in the paths of the first and second associated light beams, respectively, these two plane reflecting surfaces being fixedly positioned relative to each other at a non-zero angle bisected by the principal axis, the first associated light beam being reflected back to the beam splitting means by the first plane reflecting surface, and the second associated light beam being reflected back to the beam splitting means by the second plane reflecting surface, the two beams recombining at the beam splitting means to form a first set of optical interference fringes responsive to motion of the first and second plane reflecting surfaces transverse to the principal axis; and
   detection means for detecting the first set of optical interference fringes to produce an output indicative of gotion of the first and second plane reflecting surfaces transverse to the principal axis.

2. An interferometric system as in claim 1 wherein each of the plane reflecting surfaces comprises a plane mirror.

3. An interferometric system as in claim 2 wherein the beam splitting means includes a Wollaston prism.

4. An interferometric system as in claim 1 wherein:

the beam splitting means is adapted to additionally split the principal light beam into third and fourth associated light beams and deviate the third and fourth associated light beams from the direction of the principal light beam by equal and opposite angular deviations;

third and fourth plane reflecting surfaces are positioned in the paths of the third and fourth associated light beams, respectively, and are fixedly positioned relative to each other at a non-zero angle bisected by the principal axis and fixedly positioned relative to the first and second plane reflecting surfaces, the third and fourth associated light beams being reflected back to the beam splitting means by the third and fourth plane reflecting surfaces, respectively, the third and fourth associated light beams recombining at the beam splitting means to form a second set of optical interference fringes responsive to motion of the third and fourth plane reflecting surfaces transverse to the principal axis; and means are included for detecting the second set of optical interference fringes and determining the difference, if any, between the first set of optical interference fringes and the second set of optical interference fringes to produce an output indicative of roll motion of the first through fourth mirrors around the principal axis.

5. An interferometric system as in claim 4 wherein the third and fourth plane reflecting surfaces each comprise a plane mirror.

6. An interferometric system as in claim 5 wherein the beam splitting means includes a first Wollaston prism for deviating the first and second associated light beams and a second Wollaston prism for deviating the third and fourth associated light beams.

7. An interferometric system as in claim 1 wherein: the principal light beam is a two-frequency beam; and the beam splitting means splits the principal light beam into a first associated light beam of a first frequency and a first polarization and a second associated light beam of a second frequency and a second polarization.

8. An interferometric system as in claim 4 wherein:

the principal light beam is a two-frequency beam; and the first and third associated light beams are of a first frequency and a first polarization, and the second and fourth associated light beams are of a second frequency and a second polarization.

9. An interferometric system as in claim 4 wherein the third plane reflecting surface comprises a portion of the first plane reflecting surface and the fourth plane reflecting surface comprises a portion of the second plane reflecting surface.

* * * * *

UNITED STATES PATENT OFFICE
CERTIFICATE OF CORRECTION

Patent No. 3,790,284            Dated February 5, 1974

Inventor(s) Richard R. Baldwin

It is certified that error appears in the above-identified patent and that said Letters Patent are hereby corrected as shown below:

Column 1 of the Title Page under References Cited, the line beginning with "3,458,259" delete "Baglen" and substitute -- Bagley --.

Column 2, line 52, delete "prims" and substitute -- prism --.

Column 4, line 12, delete "21" and substitute -- 23 --.

Column 5, line 49, delete "yirrors" and substitute -- mirrors --.

Column 6, line 54, delete "gotion" and substitute -- motion --.

Signed and sealed this 9th day of April 1974.

(SEAL)
Attest:

EDWARD M. FLETCHER, JR.
Attesting Officer

C. MARSHALL DANN
Commissioner of Patents